(12) United States Patent
Sayles

(10) Patent No.: US 12,475,996 B1
(45) Date of Patent: Nov. 18, 2025

(54) COMPUTER-AUTOMATED DIGITAL ASSET MANAGEMENT USING INTEGRATED TRAY AND ASSET IDENTIFIERS

(71) Applicant: Summate Technologies, Inc., Newburyport, MA (US)

(72) Inventor: Philip William Sayles, Newburyport, MA (US)

(73) Assignee: Summate Technologies, Inc., Newburyport, MA (US)

( * ) Notice: Subject to any disclaimer, the term of this patent is extended or adjusted under 35 U.S.C. 154(b) by 0 days.

(21) Appl. No.: 19/192,265

(22) Filed: Apr. 28, 2025

Related U.S. Application Data

(60) Provisional application No. 63/653,378, filed on May 30, 2024, provisional application No. 63/647,217, filed on May 14, 2024.

(51) Int. Cl.
  *G16H 40/20* (2018.01)
  *G06K 7/10* (2006.01)
  *G06K 7/14* (2006.01)

(52) U.S. Cl.
  CPC ......... *G16H 40/20* (2018.01); *G06K 7/10297* (2013.01); *G06K 7/1413* (2013.01); *G06K 7/1417* (2013.01)

(58) Field of Classification Search
  CPC .. G16H 40/20; G06K 7/10297; G06K 7/1413; G06K 7/1417
  USPC ...................................................... 235/385
  See application file for complete search history.

(56) References Cited

U.S. PATENT DOCUMENTS

| | | | |
|---|---|---|---|
| 2004/0099724 A1* | 5/2004 | Ulrich | G06K 1/05 235/375 |
| 2006/0145856 A1* | 7/2006 | Tethrake | G06Q 10/08 340/572.1 |
| 2006/0244593 A1* | 11/2006 | Nycz | G01D 5/2291 340/572.1 |
| 2014/0263674 A1* | 9/2014 | Cerveny | G06K 19/06037 235/494 |

(Continued)

*Primary Examiner* — Ahshik Kim
(74) *Attorney, Agent, or Firm* — Blueshift IP; Robert Plotkin

(57) ABSTRACT

A system and method identify and track surgical assets on surgical trays using a combination of human-readable primary asset identification objects and unique tray identifiers. The human-readable primary asset identification objects, such as laser-engraved metal stickers, are affixed to the trays and feature short, easily-readable asset identifiers such as numbers or letters. Similarly, secondary asset identification objects may provide additional identifiers that, when combined with primary asset identifiers, enhance the specificity of asset identification. These identifiers are minimal in information content, facilitating quick and error-free human readability. Each tray is associated with a unique tray identification object that is machine-readable, containing a unique identifier for the tray. The (primary or primary and secondary) asset identifiers on the human-readable objects, when combined with the tray's unique identifier, create a globally unique identifier for each asset. This unique identifier system allows for efficient tracking and management of surgical assets without the need for repeatedly reading the tray identifier for each asset on the tray.

18 Claims, 4 Drawing Sheets

(56) References Cited

U.S. PATENT DOCUMENTS

| | | | | |
|---|---|---|---|---|
| 2016/0042130 A1* | 2/2016 | Broninx | .............. | G06F 16/2358 |
| | | | | 705/2 |
| 2018/0158549 A1* | 6/2018 | Kanubaddi | ............ | G16H 40/40 |
| 2018/0204323 A1* | 7/2018 | Sayani | ................. | G06Q 10/087 |

* cited by examiner

| Tray ID | Asset ID | Man. Part # | Description | Additional Info |
|---------|----------|-------------|-------------|-----------------|
| 204a    | 206a     | 208a        | 210a        | 210a            |
| 204b    | 206b     | 208b        | 210b        | 210b            |
| 204c    | 206c     | 208c        | 210c        | 210c            |
| 204d    | 206d     | 208d        | 210d        | 210d            |

FIG. 2

COMPUTER-AUTOMATED DIGITAL ASSET MANAGEMENT USING INTEGRATED TRAY AND ASSET IDENTIFIERS

BACKGROUND

In the medical field, particularly in surgical environments, the management of surgical assets, such as instruments and implants, is critical. These assets are typically organized on surgical trays for use during procedures.

Implants generally fall into two categories. The first category consists of "sterile" implants that are sterilized during manufacturing and maintain sterility within their packaging. These can be stored on shelves and introduced individually into the sterile surgical field as needed.

The second category consists of "non-sterile" implants that are shipped unsterile to surgical facilities. Upon receipt, these implants are removed from their packaging, placed into organizational trays, wrapped, and autoclaved for sterilization. The sterilized trays are then stored until needed for surgery, at which point they are carefully unwrapped using aseptic technique and placed inside the sterile field for the surgeon's use.

A significant challenge arises with non-sterile implants when they are removed from their original packaging and placed into surgical trays. These implants, often millimeter-sized, are typically too small for direct part marking or barcodes, causing them to lose their traceability data. This makes accurate identification of specific implants difficult during surgery, especially given that a single tray may contain hundreds of unique items.

The documentation process for these implants presents additional challenges, as nurses must record their usage in patient records using software systems outside the sterile field. This process involves multiple error-prone manual steps:

(1) Interpretation of the chosen implant's identifying part number within the sterile field
(2) Transcription of the data onto documentation at the sterile field's boundary
(3) Manual entry of the implant data into the patient record software
(4) Subsequent data entry into hospital business systems for inventory management and billing purposes.

This manual process of tracking non-sterile implant usage is time-consuming and prone to human error. To improve efficiency and accuracy, various systems have been developed that use asset identification objects, such as chips, RFID tags, and barcodes, placed on or near the assets on the trays. These objects are associated with specific assets in a database, allowing for automated identification and tracking when the objects are scanned and implanted during surgery.

Despite the advancements in asset tracking technologies, several challenges and limitations remain in the existing systems. For example, surgical trays are often densely packed with implants and instruments, leaving limited space for adding asset identification objects. This spatial limitation poses a significant challenge for retrofitting existing trays with new technologies, as there may not be adequate room to place additional asset identification objects without disrupting the layout or functionality of the tray.

Furthermore, existing trays and asset identification systems often lack standardization, which can lead to compatibility issues between different systems and technologies. For instance, a tray configured for one type of RFID tag might not be compatible with another, leading to inefficiencies and increased costs.

In addition, although it might be technically feasible to retrofit existing trays with asset identification objects, the process can be cumbersome and costly, with hundreds of thousands of trays in the field. The need to modify or redesign trays to accommodate new technologies can be a barrier to adoption, particularly for institutions with extensive existing inventories of trays that do not contain asset identification objects (e.g., chips).

Given these challenges, there is a need for an improved system and method that addresses the limitations of space constraints, ensures compatibility and standardization across different systems, reduces dependency on specific scanning technologies, yet simplifies and improves current workflows to enable more accurate and easy implant tracking.

SUMMARY

A system and method identify and track surgical assets on surgical trays using a combination of human-readable asset identification objects and unique tray identifiers. The human-readable asset identification objects, such as laser-engraved metal stickers, are affixed to the trays and feature short, easily-readable asset identifiers such as numbers or letters. These identifiers are minimal in information content, facilitating quick and error-free human readability.

Each tray is associated with a unique tray identification object that is machine-readable, containing a unique identifier for the tray. The asset identifiers on the human-readable objects, when combined with the tray's unique identifier, create a globally unique identifier for each asset. This unique identifier system allows for efficient tracking and management of surgical assets without the need to repeatedly read the tray identifier for each asset on the tray, while mitigating much of the error associated with implant usage interpretation and complex manual transcription and data entry of long and complex implant part numbers.

Embodiments of the invention enhance operational efficiency by allowing multiple asset identifiers on the same tray to be sequentially read and uniquely identified after a single reading of the tray's identifier. This system reduces the risk of human error in data entry and increases the speed of asset processing. The database linked to this system stores detailed information about the assets, which can be accessed using the unique identifiers, thus providing a comprehensive asset management solution that is both efficient and user-friendly. The invention is particularly beneficial in environments where quick and accurate asset management is critical, such as in surgical centers.

Additionally, embodiments of the invention may incorporate the use of secondary asset tags alongside the primary asset tags, each bearing secondary asset IDs that further refine the granularity of asset identification. These secondary asset IDs may be existing markings on the tray and may specify additional attributes of the assets, such as size, material, length, or specific usage properties, which are not covered by the primary asset IDs alone. When used, these secondary asset IDs are combined with the primary asset IDs and the tray's unique identifier to form an even more detailed globally unique identifier for each asset. This optional layer of detail allows for more precise and less error-prone tracking and management of assets, enabling healthcare facilities to meet specific operational or regulatory requirements.

Other features and advantages of various aspects and embodiments of the present invention will become apparent from the following description and from the claims.

BRIEF DESCRIPTION OF THE DRAWINGS

FIG. 2 is a diagram illustrating a table or other data structure which may be used to store various information about trays and assets in the system of FIG. 1 according to one embodiment of the present invention.

DETAILED DESCRIPTION

A system and method identify and track surgical assets on surgical trays using a combination of human-readable asset identification objects and unique tray identifiers. The human-readable asset identification objects, such as laser-engraved metal stickers, are affixed to the trays and feature short, easily-readable asset identifiers such as numbers or letters. These identifiers are minimal in information content, facilitating quick and error-free human readability.

Each tray is associated with a unique tray identification object that is machine-readable, containing a unique identifier for the tray. The asset identifiers on the human-readable objects, when combined with the tray's unique identifier, create a globally unique identifier for each asset. This unique identifier system allows for efficient tracking and management of surgical assets without the need for repeatedly reading the tray identifier for each asset on the tray.

Having described certain aspects of embodiments of the present invention at a high level of generality, certain embodiments of the present invention will now be described in more detail.

Figure 1:
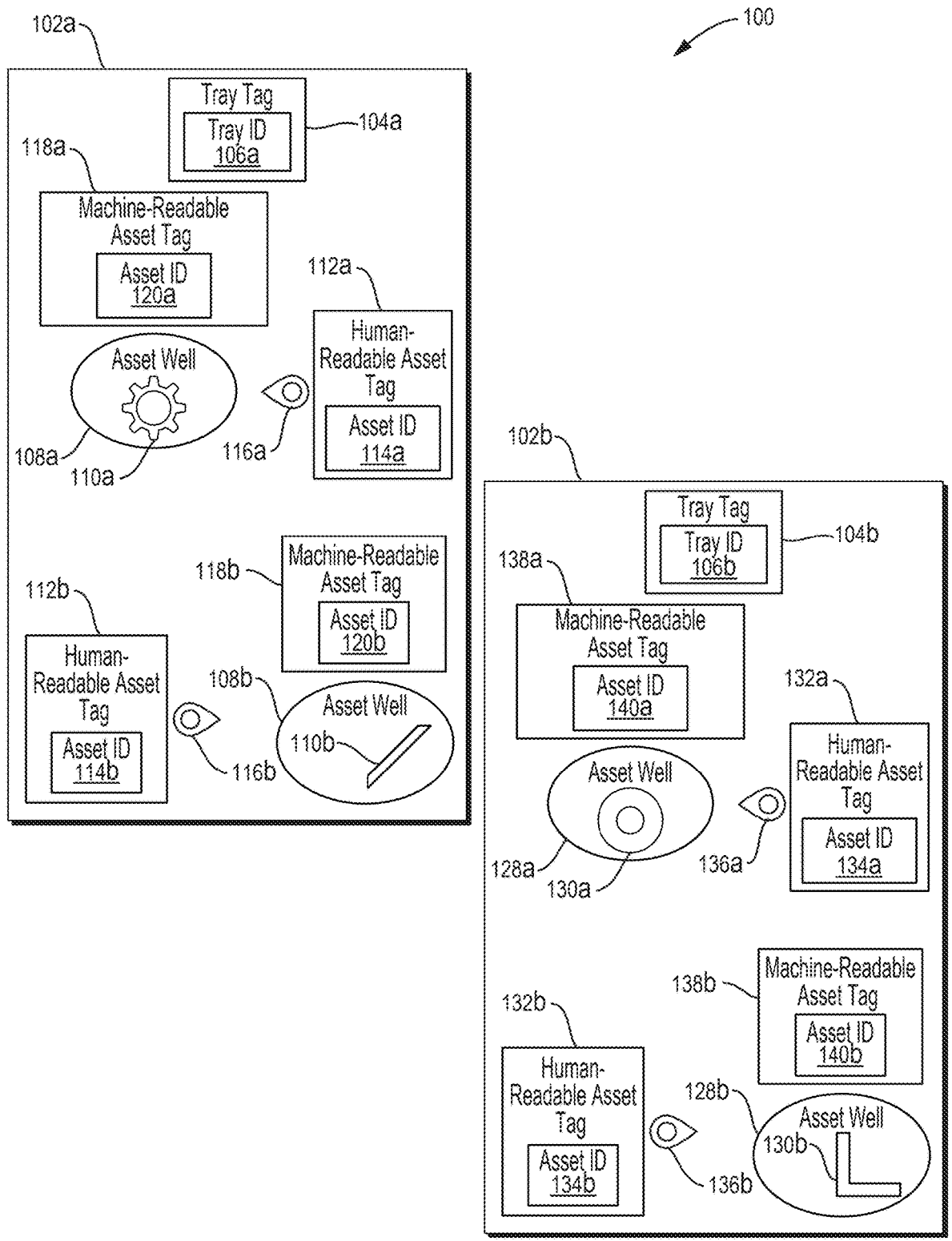
FIG. 1 is a diagram of a system containing a plurality of surgical asset trays according to one embodiment of the present invention.

Referring to FIG. 1, a diagram is shown of a system 100 containing a plurality of surgical asset trays 102a-b according to one embodiment of the present invention. Although two asset trays 102a-b are shown in FIG. 1 for ease of illustration, embodiments of the present invention may be used in connection with any number of asset trays.

Each of the asset trays 102a-b contains its own tray identification object, such as a chip, RFID tag, or barcode. For ease of explanation, tray identification objects may also be referred to herein as "tray tags," even though such objects need not be implemented as tags. For example, asset tray 102a includes tray tag 104a and asset tray 102b includes tray tag 104b. Each tray identification object (i.e., tray tag) may include a tray identifier. For example, tray tag 104a includes tray identifier 106a and tray tag 104b includes tray identifier 106b. As will be described in more detail below, the asset trays 102a-b may also include asset identification objects ("asset index tags") for identifying individual assets on the asset trays 102a-b.

Various methods can be employed to integrate tray tags into or onto their corresponding surgical trays, for purposes such as ensuring durability, accessibility, and compatibility with existing systems. Examples of methods of applying a tray tag to its corresponding surgical tray include:

Affixation to the Tray Surface: The tray tag can be affixed directly to the surface of the tray, e.g., using strong, medical-grade adhesives that are resistant to sterilization processes and harsh cleaning chemicals. This method ensures that the tag remains securely attached throughout the tray's usage and cleaning cycles.

Embedding within the Tray Material: In this method, the tray tag is embedded into the tray material during the manufacturing process. This integration can be achieved by placing the tray tag into a mold before the tray material, such as stainless steel or medical-grade plastic, is poured or set. Embedding the tag within the tray not only protects it from physical damage and environmental factors but also makes it tamper-resistant.

Attachment via a Durable Tag Holder: A durable tag holder can be attached to the tray, and the tray tag can be inserted into this holder. The holder can be designed to protect the tag from physical impacts and exposure to fluids while still allowing it to be easily scanned or read. This method allows for the replacement or updating of tray tags without needing to alter the tray itself.

Integration as Part of a Tray Handle or Edge: The tray tag can be integrated into a component of the tray, such as the handle or the edge, which is less likely to come into direct contact with the surgical assets. This placement minimizes the risk of interference with the functionality of the tray while keeping the tag easily accessible for scanning or reading purposes.

Radio-Frequency Identification (RFID) Tags: For trays compatible with electronic tracking systems, RFID tags may be used as tray tags. These can be either affixed to the tray or embedded within the tray material. RFID tags allow for contactless reading, which can streamline the process of tray identification in fast-paced environments.

Each of these methods provides a robust solution for applying tray tags to surgical trays, ensuring that the tags remain functional and accessible throughout the tray's use. The choice of integration method may depend on factors such as the tray's material, the expected usage conditions, and compatibility with existing tracking and management systems.

Each tray identification object may include a corresponding unique tray identifier (ID). For example, tray tag 104a includes unique tray identifier 106a and tray tag 104b includes unique tray identifier 106b. Such tray identifiers may be unique across some or all trays within a particular environment or set of trays.

Each tray ID is stored on its corresponding tray tag and is designed to be machine-readable, facilitating automated identification and tracking processes. The tray ID may take various forms, each suitable for different technological set-ups and operational requirements. Below are detailed descriptions of various forms that these machine-readable tray IDs may take:

Numeric Codes: Numeric codes are a simple and widely used form of data structure where the tray ID is represented by a sequence of numbers. This form is highly compatible with various types of machine-readable technologies such as barcodes and RFID tags.

Alphanumeric Strings: Alphanumeric strings consist of a combination of letters and numbers, providing a higher level of complexity and a greater number of unique identifiers than numeric codes alone. This form is versatile and can be used with a wide range of machine-readable technologies, including QR codes and OCR systems.

Binary Codes: In environments where data density and error correction are critical, binary codes can be used.

These codes represent the tray ID in binary form (0s and 1s) and are particularly suited for use in RFID and NFC technologies, where data is stored and read electronically.

Hexadecimal Codes: Hexadecimal codes use base 16 numbering, combining numbers (0-9) and letters (A-F), to represent data. This form allows for a compact representation of large numbers, which is beneficial in systems where space on the tray tag is limited but a large amount of data needs to be encoded.

Data Matrices: Data matrices are two-dimensional barcode forms that can encode tray IDs as a grid of black and white cells. They are capable of holding substantial amounts of data, including alphanumeric and binary codes, and offer excellent error correction capabilities.

Asset identifiers (primary and/or secondary) may incorporate a hierarchical structure that combines an asset class identifier with other identifying information. For example, an asset identifier may begin with an asset class identifier (e.g., a letter) that identifies the asset class (such as "A" for screws or "B" for plates), followed by any of the forms of asset identifiers described herein. Examples of such hierarchical asset identifiers include "A110" (where "A" indicates that the corresponding asset is a screw, and "110" is the asset identifier) and "B23" (where "B" indicates that the corresponding asset is a plate, and "23" is the asset identifier). This hierarchical structure maintains the benefits of short, easily-readable asset identifiers while adding informational content that aids in quick identification of asset classes. The class-identifying letter provides an additional verification mechanism during asset identification and documentation while preserving efficient human readability. The hierarchical structure may be used with either primary asset identifiers alone or in combination with secondary asset identifiers as described elsewhere herein.

Each of these forms provides a robust method for encoding the tray ID onto a tray tag, ensuring that each tray can be uniquely and accurately identified within the system. The selection of a particular form depends on factors such as the required data capacity, the environmental conditions of the usage area, and the compatibility with existing data reading systems. The flexibility in choosing among these forms allows the invention to be adapted to a wide range of operational needs and technological environments.

Tray tags suitable for use in embodiments of the present invention, such as the tray tags 104a-b, may be either machine-readable, human-readable, or both, depending on the requirements of the system in which they are used.

As will be described in more detail below, embodiments of the present invention address the aforementioned key documentation challenges associated with non-sterile implants. First, to eliminate the implant interpretation step, embodiments of the invention use human-readable asset identification objects featuring short, easily-readable asset identifiers such as single-digit numbers or simple letter combinations. This replaces the need to interpret complex part numbers during surgery. Second, to simplify the transcription process, these minimal asset identifiers are designed to be quickly readable and memorable, reducing cognitive load and transcription errors compared to recording lengthy manufacturer part numbers. For example, a nurse may only need to transcribe a simple "1" or "2" rather than a complex multi-character part number. Third, embodiments of the invention eliminate manual data entry by automatically linking these simple asset identifiers with comprehensive implant data stored in a database when combined with the tray's unique identifier. This enables embodiments of the invention to electronically transfer the complete implant information, including manufacturer part numbers and descriptions, directly into patient records and hospital business systems without requiring additional manual data entry steps. Together, these features significantly reduce the documentation burden and potential for errors in tracking implant usage during surgical procedures.

Human-readable tray tags may be designed to be easily interpreted by personnel without the need for specialized equipment. Such tags may encode their corresponding tag identifiers using, for example, any one or more of the following:

Printed Text: The most straightforward form of a human-readable tag involves text printed directly on the tray or on a label affixed to the tray. This text can include the tray's unique identifier, which may include, for example, one or more letters, numbers, or a combination thereof.

Color Coding: Trays may be marked with specific colors, where each color corresponds to a particular type or category of tray. This method allows for quick visual identification.

Iconography: Symbols or icons may be used to convey information about the tray's contents or usage, providing an intuitive way to identify the tray's purpose at a glance.

Machine-readable tray tags may be designed to be scanned or read by electronic devices, facilitating automation and reducing the potential for human error. Examples of machine-readable tray tags include:

Barcodes: One-dimensional (1D) or two-dimensional (2D) barcodes can be printed on labels or directly onto the tray. These barcodes can store the tray's unique identifier and, potentially, additional information about the tray's contents or usage history.

Radio-Frequency Identification (RFID) Tags: RFID tags can be affixed to or embedded in the tray. These tags use radio waves to communicate the tray's information to an RFID reader. RFID tags are particularly useful in environments where non-contact reading is preferable.

QR Codes: As a form of 2D barcode, QR codes can hold a larger amount of data compared to traditional barcodes. They can be scanned using a variety of devices, including smartphones, making them versatile for use in different settings.

Near Field Communication (NFC) Tags: Similar to RFID, NFC tags facilitate close-range communication with devices capable of NFC, such as tablets and smartphones. NFC tags can be particularly useful for interactive applications where additional information about the tray might be accessed through mobile devices.

As the examples above illustrate, a machine-readable tag (e.g., a machine-readable tray tag or a machine-readable asset tag) may be machine-readable and not be human-readable. For example, RFID tags and NFC tags are examples of tags which are read by reading electromagnetic signals from such tags, which can only be performed using machines. Furthermore, although in theory a barcode or QR code may be human-readable, in practice such codes are only readable by machines, especially if they are large or include a large number of bits.

The choice between human-readable and machine-readable tray tags, or a combination of both, depends on the specific needs of the healthcare facility and the level of technology integration within its operations. The use of both types of tags within a single system can provide redundancy, ensuring robustness in identification and tracking processes.

This dual-tagging approach can be particularly beneficial in transitional phases where facilities move from manual to automated systems, ensuring seamless operations throughout the transition. Even a single tray tag may be both machine-readable and human-readable in some embodiments of the present invention.

A tray tag may include both machine-readable and human-readable components containing versions of the tray identifier. The human-readable version may be either identical to or different from the machine-readable version. When identical versions are used, this provides redundancy and allows direct visual verification of the machine-readable identifier. When different versions are used, this enables several advantages: the human-readable version may, for example, be shorter and more memorable for quick reference by personnel; the human-readable version may use a more intuitive naming scheme (e.g., "Tray A" instead of a long numeric code); and/or the human-readable version may be optimized for the facility's workflow while the machine-readable version remains optimized for automated tracking. The machine-readable version may maintain the globally unique properties required for tracking, while the human-readable version may facilitate efficient human operations. The relationship between different machine-readable and human-readable versions of a tray identifier may be stored in the system's database to maintain proper correspondence.

An "asset identification object" contains an asset identifier, which is a unique identifier that corresponds to a specific asset, asset type, or location on an asset tray. This identifier facilitates the accurate and efficient organization, retrieval, and tracking of assets within a healthcare setting. For ease of explanation, asset identification objects may also be referred to herein as "asset tags," even though such objects need not be implemented as tags.

Asset identification objects may be broadly categorized into two types based on their readability: machine-readable and human-readable. Machine-readable asset identification objects may, for example, be implemented in any of the ways described above in connection with machine-readable tray identification objects (e.g., barcodes, RFID tags, QR codes, or NFC tags). The asset identifiers contained within machine-readable asset tags are encoded in a format suitable for machine reading, which enhances the speed and accuracy of asset management processes. When such machine-readable asset tags are used on a tray, the tray is often referred to as being "chipped." This integration allows for automated systems to easily detect and record the presence and specifics of each asset on the tray without manual input.

Human-readable asset identification objects may, for example, be implemented in any of the ways described above in connection with human-readable tray identification objects (e.g., using printed text, color coding, and/or iconography).

In some embodiments of the invention, a single tray may incorporate both one or more machine-readable asset tags and one or more human-readable asset tags. Even a single asset tag may be both machine-readable and human-readable in some embodiments of the present invention.

An asset identifier contained within an asset tag may, for example, take any of the forms disclosed herein in connection with tray identifiers. In some embodiments, however, the tray identification object on a tray is machine-readable (e.g., a bar code), while some or all of the asset identification objects on the tray are human-readable (e.g., stickers or other objects containing human readable text, such as a number, which may be as short as a single-digit number). As will be described in more detail below, there can be particular utility in providing a tray with: (1) a machine-readable tray identification object containing a relatively long tray identifier; and (2) one or more human-readable asset identification objects containing relatively short asset identifiers. For example, the tray identifier in such embodiments may be at least 8 bits, at least 16 bits, or at least 32 bits long, while the asset identifiers in such embodiments may consist of a single character (e.g., a single letter or number), or a short string of characters, such as a string containing only 2, 3, or 4 characters.

The use of a combination of high-bit tray identifiers and low-bit asset identifiers on a single tray has a variety of advantages. This configuration leverages the strengths of both machine-readable and human-readable technologies to optimize efficiency, accuracy, and usability in asset tracking and management.

In particular, longer bit lengths in tray identifiers allow for a larger number of unique combinations, thereby enabling embodiments of the present invention to uniquely identify a greater number of trays. This is particularly beneficial in large healthcare facilities where the volume of trays and the variety of their contents are substantial. High-bit tray identifiers also offer enhanced security features. The complexity and length of these identifiers make them more resistant to duplication and fraud, crucial in environments where the accurate tracking of surgical assets can directly impact patient safety.

Conversely, employing low-bit, human-readable identifiers for individual assets on the trays offers distinct operational benefits. For example, short asset identifiers, such as single characters or strings of 2 to 4 characters, are easily readable and memorable for human operators. This simplicity speeds up the process of manual checks and verifications, reducing the cognitive load on staff and minimizing the likelihood of errors when reading such identifiers aloud and entering them manually into computer systems. Furthermore, in fast-paced settings, the ability to quickly identify an asset visually without the need for scanning equipment is a significant advantage. Human-readable labels, such as stickers or engraved tags, facilitate this quick identification, enhancing workflow efficiency. In addition, human-readable asset identifiers generally require simpler technologies compared to their machine-readable counterparts. This can lead to reduced costs in terms of both materials and implementation.

Asset information may also be stored more compactly using combinations of globally-unique tray identifiers and asset identifiers which contain the minimal information necessary to identify them uniquely within the context of a single tray. For example, if trays contain no more than ten distinct assets or asset types, then only a single digit is required for each asset identifier. By using both tray identifiers and such short asset identifiers, it is possible to minimize the amount of information necessary to implement globally-unique asset identifiers (such as by using a relational database in which tray identifiers and asset identifiers are stored in separate tables that are related to each other in ways that enable globally-unique asset identifiers to be formed).

The combination of high-bit, machine-readable tray identifiers and low-bit, human-readable asset identifiers on a single tray creates a synergistic effect that enhances the overall functionality of asset management systems. In particular, this approach combines the benefits of high-bit machine-readable tray identifiers described above with the benefits of low-bit human-readable asset identifiers described above.

Asset identification objects are said herein to "identify," "correspond to," or "be associated with" specific assets, sets of assets, types of assets, or specific locations on the tray that contains the asset identification object.

An asset identification object may correspond to a single asset on the tray, such as a specific surgical instrument like a scalpel or a particular screw or bolt. This direct association allows for precise tracking and management of each individual asset, facilitating accurate inventory control and immediate identification for usage or replacement.

An asset identification object may correspond to a set of assets on the tray. These assets typically share common characteristics or functions, such as a set of screws or bolts of the same type. Such a set of assets may share common metadata, such as a common part number. This grouping allows for efficient management of assets that are used for the same purpose, eliminating the need to deploy multiple asset identification objects for each instance of such assets.

An asset identification object may also be associated with a particular type of asset. For example, all assets of a specific model or part number, like a type of screw or bolt, may be identified by a single asset identification object. This categorization may provide the same or similar benefits as associating an asset identification object with a set of assets.

An asset identification object may correspond to a specific location on the tray, such as a designated well or compartment that is configured to hold a particular type of asset. Such a spatial association may be useful, for example, when asset identifiers contained within asset identification objects only indirectly identify the assets on the tray (see explanation below).

As will be described in more detail below in connection with various methods that may be performed by embodiments of the present invention, a human operator may identify and read (manually or using a device, such as a wand) asset identifiers from asset identification objects on a tray. For example, when a particular asset is removed from the tray, a human operator may read the asset identifier from the asset identification object that corresponds to the removed asset. To do so, the human operator must identify the asset identification that corresponds to the removed asset, so that the human operator can read the asset identifier from the correct asset identification object identifier from among the plurality of asset identification objects on the tray. Embodiments of the present invention may facilitate such identification in any of a variety of ways, such as by locating and/or orienting each asset identification object in relation to its corresponding asset, set of assets, type of asset, or tray location in a way that facilitates identifying the asset identification object based on its corresponding asset, set of assets, type of asset, or tray location.

Asset identification objects can be placed immediately next to the asset or set of assets on the tray, within no more than some maximum distance. This method is particularly useful for assets that are too small or delicate to be directly labeled, such as surgical screws or small instruments. For sets of assets or types of assets, a single identification object may be placed in a central location that is easily visible when accessing any part of the set. This could be at the center of a group of assets or at the edge of a compartment within the tray that houses similar assets.

An asset identification object may include a "directional member," which points at or towards the asset identification object's corresponding asset, asset set, asset type, or tray location. One of the simplest and most effective forms of directional members is the use of arrows. These may be, for example, arrows that are printed directly on labels or tags that are part of or adjacent to the asset identification object; separate arrow stickers placed on the asset identification object or tray to point towards the corresponding asset, asset set, asset type, or tray location; a plastic or metal member that is pointer or tapered to point at or towards the corresponding asset, asset set, asset type, or tray location; a laser pointers or LED light that projects a beam of light or a lit arrow onto the tray or in the direction of the corresponding asset, asset set, asset type, or tray location.

Certain implementations of asset identification objects, asset identifiers, and assets are shown in the system 100 of FIG. 1. In that system 100, the asset tray 102*a* includes asset 110*a* and asset 110*b*, and the asset tray 102*b* includes asset 130*a* and asset 130*b*. Although two assets are shown in each of the trays 102*a-b*, this is merely an example and not a limitation of the present invention. Any tray may include any number and type of asset(s) in any combination, and different trays may include different numbers and types of assets.

Asset tray 102*a* includes an asset well 108*a*, which includes asset 110*a*, and an asset well 108*b*, which includes asset 110*b*. Similarly, asset tray 102*b* includes an asset well 128*b*, which includes asset 130*b*, and an asset well 128*b*, which includes asset 130*b*. The particular numbers of asset wells shown in FIG. 1 are merely examples and not limitations of the present invention. Furthermore, asset wells are merely one examples of tray containers which may be used to hold assets. Furthermore, embodiments of the present invention may be used in connection with trays that do not include any such containers, and in connection with trays in which one or more assets are not contained within any such containers.

The following discussion will refer to the assets 110*a-b* and 130*a-b*. Any reference to an individual asset (such as asset 110*a*) should be understood to be equally applicable to a plurality (set) of assets, to a type of asset, or to a location on the tray. For example, any reference to asset 110*a* should be understood to be applicable to the asset well 108*a* which contains the asset 110*a*. As another example, the asset 110*a* may instead be a plurality of assets (e.g., a plurality of assets, such as screws or bolts, having a common part number), and any reference to the asset 110*a* should be understood to be applicable to such a plurality of assets. For example, any reference herein to the asset that corresponds to the human-readable asset tag 112*a* should be understood to be equally applicable to a plurality of assets that correspond to the human-readable asset tag 112*a*, to a type of asset that corresponds to the human-readable asset tag 112*a*, or to a tray location (e.g., the asset well 108*a*) that corresponds to the human-readable asset tag 112*a*.

Asset tray 102*a* includes a human-readable asset tag 112*a*, which includes an asset identifier 114*a*. Assume that the human-readable asset tag 112*a* corresponds to the asset 110*a*. Similarly, asset tray 102*a* includes a human-readable asset tag 112*b*, which includes an asset identifier 114*b*. Assume that the human-readable asset tag 112*b* corresponds to the asset 110*b*.

Asset tray 102*b* includes a human-readable asset tag 132*a*, which includes an asset identifier 134*a*. Assume that the human-readable asset tag 132*a* corresponds to the asset 130*a*. Similarly, asset tray 102*b* includes a human-readable asset tag 132*b*, which includes an asset identifier 134*b*. Assume that the human-readable asset tag 132*b* corresponds to the asset 130*b*.

In some embodiments, some or all assets on a tray may also have a corresponding machine-readable asset tag. For example, in the system 100 of FIG. 1, the asset tray 102*a* includes a machine-readable asset tag 118*a*, which includes an asset identifier 120a. Assume that the machine-readable asset tag 118a corresponds to the asset 110a. Similarly, asset tray 102a includes a machine-readable asset tag 118b, which includes an asset identifier 120b. Assume that the machine-readable asset tag 118b corresponds to the asset 110b. The asset identifier on an asset's corresponding machine-readable asset tag may be different from the asset identifier on that asset's corresponding human-readable asset tag. For example, the asset identifier 120a on the machine-readable asset tag 118a corresponding to asset 110a may be different from the asset identifier 114a on the human-readable asset tag 112a corresponding to asset 110a. As a particular example, the machine-readable asset identifier 120a may be longer than the human-readable asset identifier 114a.

Asset tray 102b includes a machine-readable asset tag 138a, which includes an asset identifier 140a. Assume that the machine-readable asset tag 138a corresponds to the asset 130a. Similarly, asset tray 102b includes a machine-readable asset tag 138b, which includes an asset identifier 140b. Assume that the machine-readable asset tag 138b corresponds to the asset 130b.

In the particular example of FIG. 1, the four assets 110a, 110b, 130a, and 130b are shown as being of different types. This is merely an example and does not constitute a limitation of the present invention. Trays may include any number of assets of the same or different types, in any combination.

Some or all of the tray identifiers in a particular embodiments of the present invention may be unique (i.e., differ from each other). For example, in FIG. 1 the tray IDs 106a-b may be globally unique, which implies that tray ID 106a may differ from tray ID 106b.

Within a particular tray, all of the asset identifiers of the human-readable asset tags contained in that tray may be unique. For example, all of the asset IDs 114a-b within the human-readable asset tags 112a-b on tray 102a may be unique (i.e., differ from each other). Similarly all of the asset IDs within the human-readable asset tags 132a-b on tray 102b may be unique (i.e., differ from each other).

The asset IDs of human-readable asset tags may not, however, be unique across trays. As this implies, two different trays may contain human-readable asset tags which have asset IDs that are the same as each other. For example, the asset ID 114a of the human-readable asset tag 112a on tray 102a may be the same as the asset identifier 134b of the human-readable asset tag 132b on asset tray 102b. As a particular example, both the asset identifier 114a and the asset identifier 134a may be a short, human-readable, string, such as the number "1."

In other words, tray IDs may be globally unique, while asset IDs may only be locally unique within the context of the trays that contain them.

However, for each tray, the combination of the tray's tray ID and any particular asset ID of a human-readable asset tag on that tray may be globally unique. For example, the following may be globally unique within the system 100: the combination of tray identifier 106a and asset identifier 114a; the combination of tray identifier 106a and asset identifier 114b; the combination of tray tag 106b and asset identifier 134a; and the combination of tray tag 106b and asset identifier 134b.

There may or may not be any relationship between the manufacturer's part number of an asset and the globally-unique asset ID for that asset that is formed based on a combination of the tray ID of the tray containing the asset and the asset ID corresponding to the asset. For example, an asset's manufacturer's part number and the asset's globally-unique ID may be the same as or differ from each other. In practice, they will often be completely distinct from each other. In particular, the asset ID that is stored in an asset tag corresponding to an asset may differ from that asset's manufacturer's part number in any of a variety of ways. For example, as described elsewhere herein, the asset's asset ID may be a relatively short (e.g., single-digit) string, while the asset's manufacturer's part number may be relatively long strings or other data structures. An asset's asset ID and/or globally-unique ID may, for example, be used to identify that asset's manufacturer's part number in any of a variety of ways, such as by using the asset's asset ID and/or globally-unique ID to look up the asset's manufacturer's part number in a database or other data structure which includes a mapping from asset IDs and/or globally-unique IDs to manufacturer's part numbers.

Referring to FIG. 2, a diagram is shown which illustrates a table 200 or other data structure (e.g., database) which may be used to store various information about trays 102a-b and assets 110a-b and 130a-b in the system 100 of FIG. 1.

The table 200 may contain a tray ID column 202a for storing tray identifiers, an asset ID column 202b for storing asset identifiers, a manufacturer's part number column 202c for storing manufacturer's part numbers of assets, a description column 202d for storing descriptions of assets, and an additional information column 202e for storing additional information about assets. The table design shown in FIG. 2 is a simplified design which is used merely for ease of illustration and explanation. In practice, any of a variety of data structures may be used to store data about trays and assets and to assist in performing a variety of other functions disclosed herein. Some examples of additional information that may be stored in the table 200 about each of a plurality of assets includes a disposition, a unit of measure (e.g., centimeters or inches), and material composition (e.g., stainless steel or titanium).

Any of a variety of actions may be performed in connection with assets in the trays 102a-b in the system 100. For example, an asset may be stored into a tray, removed from a tray for use (e.g., in surgery), removed from a tray and then discarded, or put back into a tray after having previously been removed from the tray (replaced). When any such action is performed on an asset that stored in a tray or that previously was stored in a tray, embodiments of the present invention may be used to easily store a record of such an action in the table 200. Additionally or alternatively, embodiments of the present invention may be used to easily store a record of the disposition of the asset in the table 200.

Figure 4:
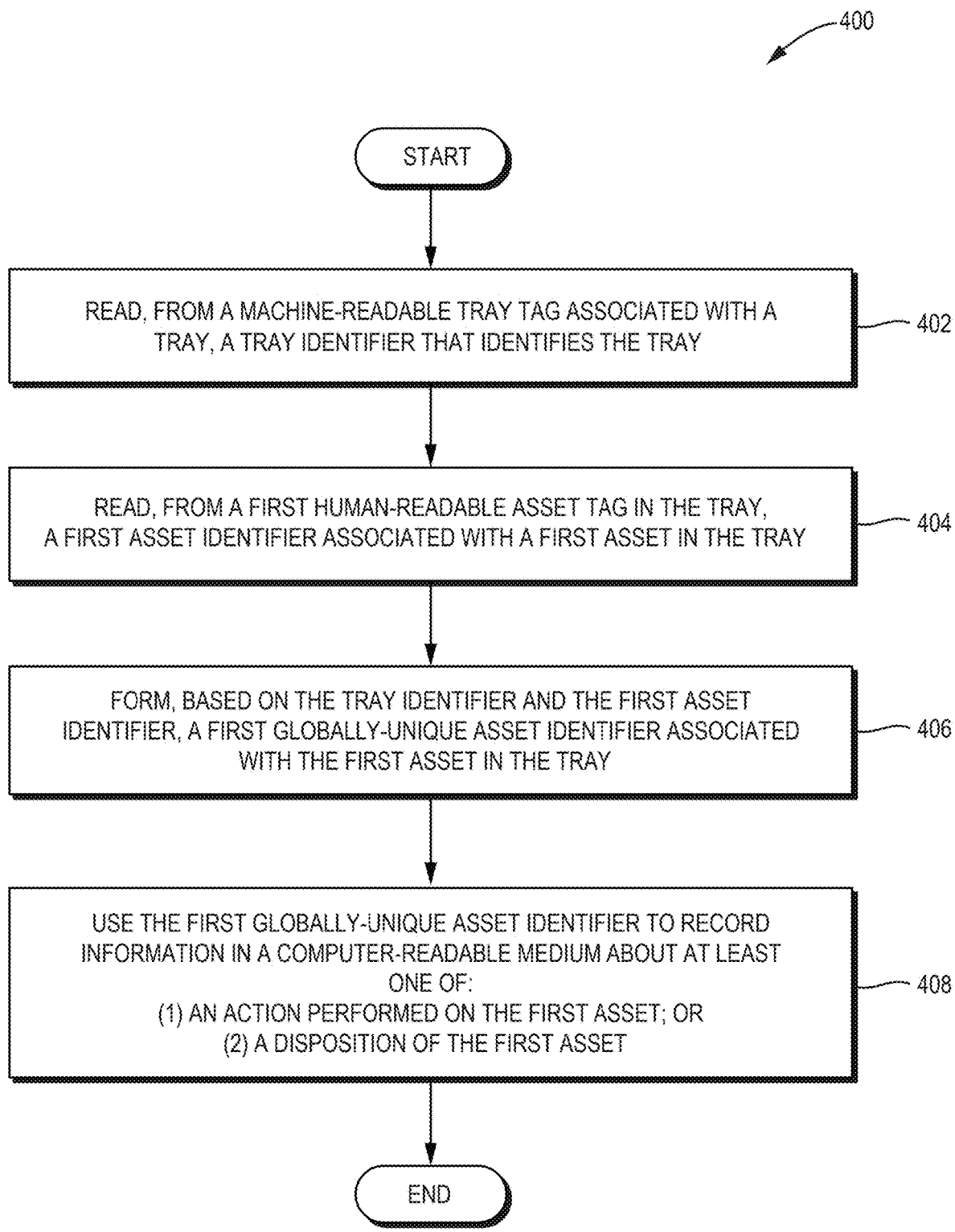
FIG. 4 is a flowchart of a method performed using the system of FIG. 1 to track and record actions performed on assets according to one embodiment of the present invention.

For example, when any action is performed on an asset stored in (or previously stored in) a tray, the following steps may be performed: (1) the tray that contains (or previously contained) the asset is identified; (2) the tray tag of the identified tray is identified; (3) the tray ID of the identified tray is read from the identified tray tag (FIG. 4, operation 402); (4) the human-readable asset tag that is associated with the asset is identified; and (5) the asset ID of the asset is read from the identified human-readable asset tag (FIG. 4, operation 404). The read tray ID and the read asset ID may be used to store information about the action that was performed on the asset and/or to store information about the disposition of the asset. For example, a globally-unique asset ID may be formed using the read tray ID and the read asset ID (FIG. 4, operation 406), and that globally-unique asset ID may be used to store information about the performed action and/or disposition of the asset (FIG. 4, operation 408). The globally-unique asset ID may, for example, include both the read tray ID and the read asset ID.

The identified tray tag may be machine-readable. As this implies, the tray ID may be read from the tray's tray tag by a machine (e.g., a wand that reads RFID tags). For example, when an asset is removed from or stored into the tray, a human operator may use a wand to scan the tray ID of the tray from which the asset was removed. The machine that reads that tray ID may be coupled, directly or indirectly, with the computer system that stores records asset records (e.g., the table 200). As a result, the tray ID may be provided to such a computer system automatically and stored automatically by such a computer system, without the need for further human intervention.

The identified asset tag may be human-readable. As a result, the asset ID of the asset may be read from the identified human-readable asset tag by a human. The same human, or a different human, may manually enter the read asset ID into a computer system, such as the same computer system that received and/or stored the tray ID. For example, one human may both read the asset ID from the human-readable asset tag and then type or otherwise manually enter the read asset tag into the computer system. As another example, one human may read the asset ID from the human-readable asset tag and speak that asset ID aloud, and another human may hear the spoken asset ID and type or otherwise manually enter that asset ID into the computer system.

In another embodiment, the process of recording asset information is further streamlined by integrating voice recognition technology to capture and record asset IDs. This embodiment leverages an active listening device or application, such as Amazon Alexa or Apple Siri, which are equipped with speech recognition capabilities. Such a voice-activated device or application may be installed in or otherwise accessible in the environment where the assets are managed (e.g., a surgical room, a warehouse). This device or application may be connected to the computer system that manages asset data. When a human reads a tray ID and/or asset ID in the manner described above, the human may also speak a trigger phrase or other voice command that triggers the voice device/application to listen to and record the human's subsequent speech. The voice command may, for example, have a hierarchical structure, such as a trigger phrase followed by the tray name and asset ID, such as "Alexa, record distal radius tray, implant twenty-three."

The active listening device/application, continuously monitoring for voice commands, detects the spoken phrase. The application/device uses built-in speech recognition software to parse the command and extract the asset ID. The recognized asset ID is automatically transmitted to the connected computer system. The system then records the asset ID along with any associated actions or context, such as the time of access, the user who accessed it, and the specific tray ID if needed, in any of the ways disclosed herein.

Referring again to FIG. 2, each of the rows of the table 200 may, for example, contain information about a particular globally-unique tray ID/asset ID combination. For example, row 212a may contain information about a first globally unique tray ID/asset ID combination, row 212b may contain information about a second globally unique tray ID/asset ID combination, row 212c may contain information about a first globally unique tray ID/asset ID combination, and row 212d may contain information about a first globally unique tray ID/asset ID combination. This is merely one example of a data structure design that may be used by embodiments of the present invention, and is not a limitation of the present invention.

In general, information about actions performed on, and/or the disposition of, a particular asset may be stored by embodiments of the present invention in a corresponding row in the table 200. For example, assume that:

Row 212a corresponds to asset 110a. In particular, cell 204a contains the tray identifier 106a of the asset tray 102a that contains (corresponds to) asset 110a; cell 206a contains the asset identifier 114a of the asset 110a; cell 208a contains information about an action performed on, and/or the disposition of, the asset 110a; and cell 210a contains additional information about the asset 110a.

Row 212b corresponds to asset 110b. In particular, cell 204b contains the tray identifier 106a of the asset tray 102a that contains (corresponds to) asset 110b; cell 206b contains the asset identifier 114b of the asset 110b; cell 208b contains information about an action performed on, and/or the disposition of, the asset 110b; and cell 210b contains additional information about the asset 110b.

Row 212c corresponds to asset 130a. In particular, cell 204c contains the tray identifier 106b of the asset tray 102b that contains (corresponds to) asset 130a; cell 206c contains the asset identifier 134a of the asset 130a; cell 208c contains information about an action performed on, and/or the disposition of, the asset 130a; and cell 210c contains additional information about the asset 130a.

Row 212d corresponds to asset 130b. In particular, cell 204d contains the tray identifier 106b of the asset tray 102b that contains (corresponds to) asset 130b; cell 206d contains the asset identifier 134b of the asset 130b; cell 208d contains information about an action performed on, and/or the disposition of, the asset 130b; and cell 210d contains additional information about the asset 130b.

The table 200 may, for example, be pre-populated with the tray IDs and asset IDs of some or all of the assets on the trays, meaning that such information may be stored in the table 200 even before the tray IDs and asset IDs have been read from the trays and assets in use. Then, when a particular tray ID and asset ID are read, embodiments of the present invention may use that tray ID and asset ID to find a corresponding row containing that tray ID and asset ID in the table 200. Any additional information relating to the action performed on, and/or the disposition of, the asset may then be stored in that row of the table 200 (e.g., in column 202e).

As another example, the tray IDs and asset IDs may not be pre-populated in the table 200. Instead, when a particular tray ID and asset ID are read, embodiments of the present invention may create a new row in the table 200; store the read tray ID in column 202a of the new row; store the read asset ID in column 202b of the new row; store the manufacturer's part number 202c of the asset corresponding to the combination of tray ID and asset ID in column 202b of the new row; store a description of the asset in column 202d; and store any additional information about the asset, action, and/or disposition in column 202e of the new row.

The information that is stored in the tray ID column 202a of a particular row may or may not be identical to the tray ID that was read from the corresponding tray tag. Embodiments of the present invention may use any of a variety of techniques to generate or otherwise identify the contents of the tray ID column 202a for a particular row based on the tray ID that was read from the corresponding tray tag, possibly in combination with other information.

Similarly, the information that is stored in the asset ID column 202*b* of a particular row may or may not be identical to the asset ID that was read from the corresponding asset tag. Embodiments of the present invention may use any of a variety of techniques to generate or otherwise identify the contents of the asset ID column 202*b* for a particular row based on the asset ID that was read from the corresponding asset tag, possibly in combination with other information.

Information that may be stored in column 202*e* of a row that contains information about an asset may include, for example, a description and/or identifier of an action that was performed on the corresponding asset, such as "removed" or "added." As another example, information about a temporary or final disposition of the corresponding asset may be stored in column 202*e*, such as "in patient," "returned to tray," or "wasted."

The description of an asset that is stored in column 202*d* may include any of a variety of information, such as type, model, manufacturer, and specifications. This helps in identifying the exact nature of the asset.

Any of a variety of information about an asset may be stored in column 202*e* of the row corresponding to that asset. Some examples of such information include:
- Location: Current location of the asset if it moves between different trays or locations. This is crucial for tracking the asset's whereabouts within large facilities.
- Status: Current status of the asset (e.g., available, in use, under maintenance, sterilized, needs replacement). This helps in operational planning and maintenance scheduling.
- Usage History: Data on how often and in what context the asset has been used. This can include the date and time of each use, the duration of use, and the personnel who used it.
- Maintenance Records: Details of any maintenance work performed on the asset, including dates, descriptions of the work, and the identity of the technician or service provider.
- Purchase Information: Date of purchase, price, warranty details, and supplier information. This is useful for financial tracking and warranty management.
- Regulatory Compliance: Information related to compliance with relevant standards or regulations, which may include certification statuses, inspection dates, and compliance check results.
- Disposal Information: Details about the disposal of the asset, including the date of disposal, method of disposal, and reasons for disposal, which is important for compliance with environmental regulations.

The additional information that is stored in column of a row for a particular asset may be generated and/or obtained in any of a variety of ways. For example, such information may be obtained, using the asset's tag ID and/or asset ID, from an external system, such as an Enterprise Resource Planning (ERP) system, maintenance management software, supplier database, and/or regulatory database. Additionally or alternatively, data may be entered manually into the column 202*e* of any row in the table 200.

If asset IDs are read sequentially from multiple assets in the same tray, it is not necessary to re-read the tray ID from that tray repeatedly. Instead, the tray ID may be read once, and embodiments of the present invention may re-use that tray ID in connection with multiple asset IDs. Consider an example in which the asset identifier asset identifier 114*a* is to be read from human-readable asset tag 112*a*, followed by reading the asset identifier 114*b* from the human-readable asset tag 112*b*. Because both of the human-readable asset tags 112*a-b* are on the same asset tray 102*a*, embodiments of the present invention may perform the following steps to re-use the tray identifier 106*a* for multiple assets: (1) the tray identifier 106*a* of the asset tray 102*a* is read; (2) the asset identifier 114*a* of the human-readable asset tag 112*a* is read; (3) the read tray identifier 106*a* and the read asset identifier 114*a* are used as a globally-unique ID of the asset 110*a* in any of the ways disclosed herein; (4) the asset identifier 114*b* of the human-readable asset tag 112*b* is read; and (5) the read tray identifier 106*a* and the read asset identifier 114*b* are used as a globally-unique ID of the asset 110*b* in any of the ways disclosed herein As the example above illustrates, by re-using the same tray ID across multiple asset IDs, the amount of effort required to obtain the required information to record asset transactions is reduced. Only when an asset ID is read from a different tray (e.g., the tray 102*b*) does it become necessary to read the tray ID of that tray.

Embodiments of the present invention may enable a tray tag to be read only once at the beginning of a surgical episode (e.g., a surgery). Such embodiments may even enable multiple tray tags to be read only once at the beginning of a surgical episode. For example, at the beginning of a surgical episode, such as a surgery, the tray IDs of one or more trays are machine-read from one or more tray tags using any of the techniques disclosed herein. For example, the tray identifier 106*a* of the tray tag 104*a* may be machine read, and the tray identifier 106*b* of the tray tag 104*b* may be machine-read, using any of the techniques disclosed herein. This initial scan captures the unique identifiers associated with each tray present during the surgical episode.

Once the tray IDs are captured, a human-readable description is assigned to each scanned tray ID. These descriptions may, for example, be concise yet descriptive texts, such as "Cannulated Screw" or "Distal Radius," which clearly indicate the contents or purpose of the tray. The assignment of these human-readable descriptions is done either manually by a system operator or automatically by the system if the descriptions are pre-defined by the system (e.g., in a database which maps tray IDs to human-readable descriptions).

Embodiments of the present invention may store an association between each tray ID and its corresponding human-readable description. Such an association may, for example, be stored in the table 200. Such stored associations may be used to map from a machine-readable tray ID to its corresponding human-readable description and/or from a tray's human-readable description to its corresponding machine-readable tray ID.

The human-readable descriptions associated with each tray ID may be displayed on a screen accessible to the surgical episode operators. This display acts as a reference point for the operators, allowing them to quickly identify the correct tray based on its description without needing to rescan the tray tag.

During the surgical episode, when an action is performed in connection with an asset—such as removing an asset from a tray—the human operator identifies the tray associated with the asset and identifies the human-readable description associated with that tray. For example, the human operator may see that the asset was removed from a tray containing cannulated screws and/or such a tray may have a label reading "Cannulated Screws" affixed to it. The operator may identify the human-readable description of that tray on-screen.

The human operator may read the asset's human-readable asset ID using any of the techniques disclosed herein. The human operator may use the above-identified human-readable tray description and the identified asset ID to record, in the computer system, information about the action performed on the asset. For example, the human operator may: (1) enter and/or select the tray's human-readable description; and (2) enter and/or select the asset's human-readable asset ID. Embodiments of the present invention may use the combination of human-readable tray description and human-readable asset ID to identify or create a globally-unique identifier of the asset, and store that globally-unique identifier in the table 200 in connection with information about the action performed on the asset. As a particular example, embodiments of the present invention may map the human-readable tray description to its corresponding machine-readable tray ID, and then use any of the techniques disclosed herein to store information about the action performed on the asset using the combination of machine-readable tray ID and human-readable asset ID.

The method just described significantly streamlines the workflow during surgical episodes by eliminating the need for repeated machine readings of the tray tags after the initial setup. By using human-readable tray descriptions and manual entry of asset IDs, the system reduces the dependency on repeated scanning of tray tags, which can be beneficial in environments where speed and efficiency are critical, and where technological interruptions might be disruptive. Note in particular that the method just described enables transactions involving multiple assets on multiple trays to be recorded without needing to scan the machine-readable tray tag on each tray more than once. Instead, each such machine-readable tray tag may be scanned once at the beginning of the surgical episode and human-readable descriptions corresponding to the scanned trays may subsequently be used to identify the relevant trays in individual transactions, even if such transactions involve assets from different trays, without needing to rescan the machine-readable tray tags again.

Figure 3:
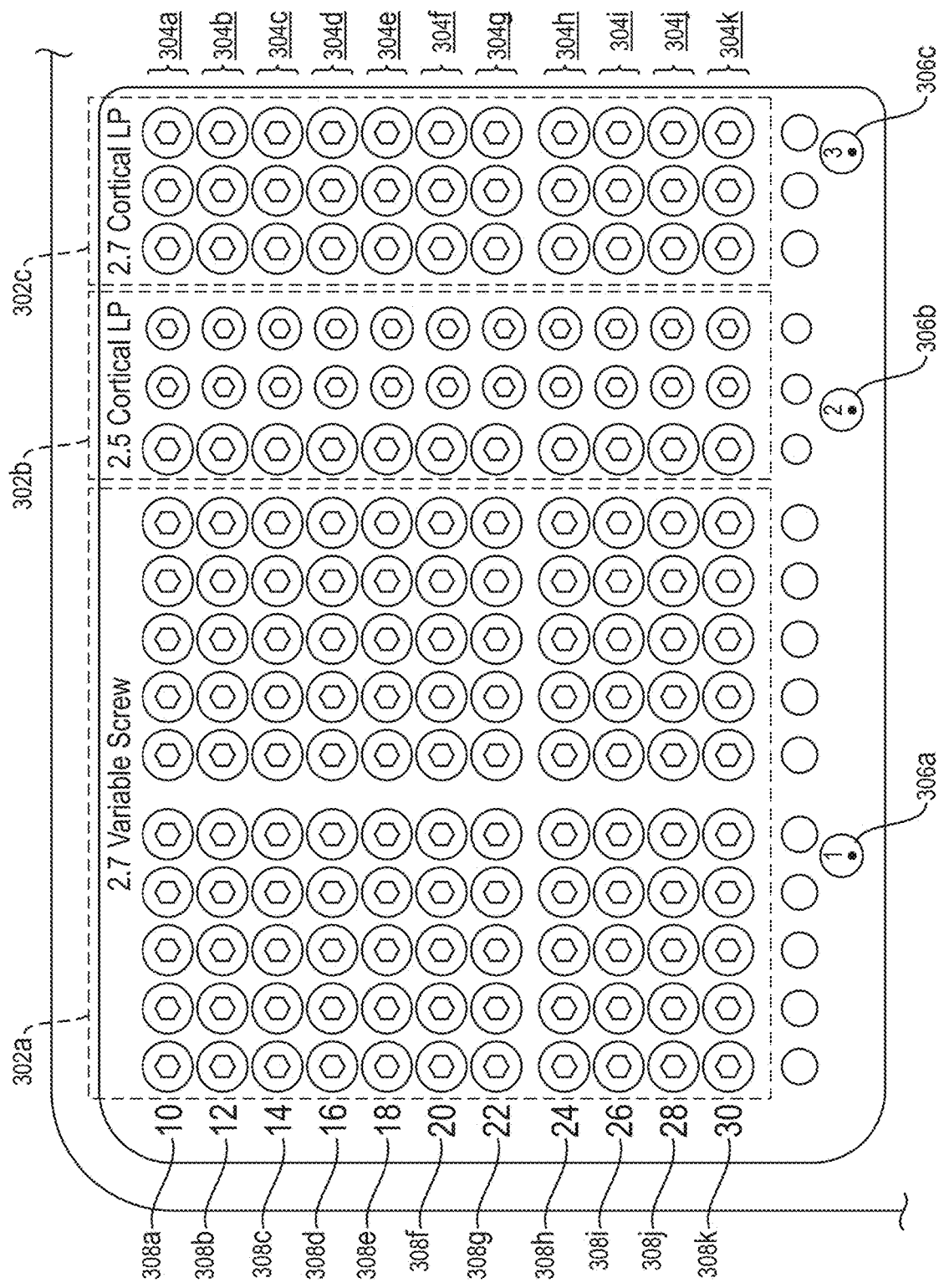
FIG. 3 is an illustration of a tray including both primary asset tags and secondary asset tags for identifying assets on the tray according to one embodiment of the present invention.

In some embodiments of the present invention, assets on a tray may be grouped into both "primary asset groups" and "secondary asset groups." An example of such an embodiment in shown in the example asset tray 300 of FIG. 3. As shown therein, the asset tray 300 may include a plurality of primary asset groups 302*a-c* and a plurality of secondary asset groups 304*a-k*. The particular numbers and primary asset groups and secondary asset groups shown in FIG. 3 are merely examples and do not constitute limitations of the present invention. Furthermore, the particular numbers of assets within the primary asset groups 302*a-c* and the secondary asset groups 304*a-k* shown in FIG. 3 are merely examples and do not constitute limitations of the present invention. In addition, the layout of the primary asset groups 302*a-c* and the secondary asset groups 304*a-k* shown in FIG. 3 are merely examples and do not constitute limitations of the present invention.

For example, a primary asset group may include as little as a single asset. As another example, a primary asset group may be defined by reference to a type of asset, rather than a specific set of instances of an asset. The assets in a primary asset group may or may not be co-located on the asset tray 300. As yet another example, a primary asset group may be defined by reference to a location or area on the asset tray 300.

Although not shown in FIG. 3, a tray tag may be affixed to or otherwise associated with the asset tray 300, and thereby play the role of the tray tag 104*a* shown in FIG. 1.

The asset tray 300 may include a plurality of primary asset tags 306*a-c*, each of which corresponds to a distinct one of the plurality of primary asset groups 302*a-c*. For example, primary asset tag 306*a* corresponds to primary asset group 302*a*; primary asset tag 306*b* corresponds to primary asset group 302*b*; and primary asset tag 306*c* corresponds to primary asset group 302*c*. Each of the primary asset tags 306*a-c* may include a corresponding asset ID (also referred to herein as a "primary asset ID"), each of which may be unique among all of the primary asset tags on the asset tray 300. In this regard, the primary asset tags 306*a-c* may perform the same or similar function to the asset tags 112*a-b* in the system 100 of FIG. 1.

Similarly, a secondary asset group may include as little as a single asset. As another example, a secondary asset group may be defined by reference to a type of asset, rather than a specific set of instances of an asset. The assets in a secondary asset group may or may not be co-located on the asset tray 300. As yet another example, a secondary group may be defined by reference to a location or area on the asset tray 300.

The asset tray 300 may include a plurality of secondary asset tags 308*a-k*, each of which corresponds to a distinct one of the plurality of secondary asset groups 304*a-k*. For example, secondary asset tag 308*a* corresponds to secondary asset group 304*a*; secondary asset tag 308*b* corresponds to secondary asset group 304*b*; secondary asset tag 308*c* corresponds to secondary asset group 304*c*; and so on. Each of the secondary asset tags 308*a-k* may include a corresponding asset ID (also referred to herein as a "secondary asset ID"), each of which may be unique among all of the secondary asset tags on the asset tray 300.

As a result, both a primary asset tag and a secondary asset tag may be associated with a single asset, asset type, set of assets, or locations on the tray. As this implies, any particular asset on the asset tray 300 may be associated with both a corresponding primary asset tag (and the primary asset ID it contains) and a corresponding secondary asset tag (and the secondary asset ID it contains).

As shown in the example of FIG. 3, the primary asset IDs on the primary asset tags 306*a-c* may be unique not only among all of the primary asset tags 306*a-c* on the asset tray 300, but also be unique among all of the primary asset tags 306*a-c* and all of the secondary asset tags 308*a-k* on the asset tray 300. Similarly, as shown in the example of FIG. 3, the secondary asset IDs on the secondary asset tags 308*a-k* may be unique not only among all of the secondary asset tags 308*a-k* on the asset tray 300, but also be unique among all of the primary asset tags 306*a-c* and all of the secondary asset tags 308*a-k* on the asset tray 300. For example, in the asset tray 300 of FIG. 3, the primary asset tags 306*a-c* include the human-readable primary asset IDs of "1", "2", and "3", while the secondary asset tags 308*a-k* include the human-readable secondary asset IDs of "10", "12", "14", "16", "18", "20", "22", "24", "26", "28", and "30".

Using such tray-wide unique asset IDs may be useful for reducing errors when a human operator reads the primary asset IDs and the secondary asset IDs from the asset tray 300. For example, as the above implies, for any particular asset on the asset tray 300, the corresponding primary asset ID may differ from the corresponding secondary asset ID. This may reduce the likelihood that a human operator will read those primary and secondary asset IDs incorrectly, and/or reduce the likelihood that a human operator will input second primary and secondary asset IDs incorrectly into a computer system (such as by inadvertently swapping the primary asset ID with the secondary asset ID).

The primary asset IDs on the primary asset tags 306a-c and the secondary asset IDs on the secondary asset tags 308a-c may take any of the variety of forms disclosed herein, such as numbers (e.g., single-digit numbers) or alphanumeric strings. The form of the primary asset IDs may be the same as or differ from the form of the secondary asset IDs in any of a variety of ways. For example, the primary asset IDs may consist of numbers, while the secondary asset IDs may consist of letters.

The secondary asset tags 308a-c may, for example, be existing markings on the asset tray 300, such as existing printed numbers and/or letters on the asset tray 300. Using such existing markings for the purposes disclosed herein enables the benefits disclosed herein to be obtained from the secondary asset tags 308a-c without needing to add tags to, or otherwise modify, the asset tray 300. For example, screws of various classes (types) are often stored within a single asset tray, with the only differentiating characteristic between the different classes of screw being their length. The screw lengths typically are indicated on the tray at the time of manufacture via printing or etching, at the top of or otherwise clearly associated with a row of the same length within the class of screw. A tray may have one or several classes of screws, and within those classes, screws of variable length. For any particular screw, embodiments of the present invention may use the primary asset tag to indicate the class of screw, and may use the pre-existing length indicator on the tray to play the role of a secondary asset tag. Embodiments of the present invention may use the printed markings on such a secondary asset as a secondary asset ID, in combination with the primary asset ID read from the primary asset tag, to form a complete asset ID for the particular class and length of screw to be used in any of the ways disclosed herein.

As described above, the combination of a tray ID and asset ID may form, explicitly or implicitly, a globally unique identifier for an asset, set of assets, type of assets, or tray location. Similarly, the combination of a tray ID, primary asset ID, and secondary asset ID may form, explicitly or implicitly, a globally unique identifier for an asset, set of assets, type of assets, or tray location. The combination of a primary asset ID and a secondary asset ID may form, explicitly or implicitly, a unique identifier for an asset, set of assets, type of assets, or tray location within the scope of a particular tray.

For example, the primary asset IDs stored in the primary asset tags 306a-c on the asset tray 300 may be associated with a first set of asset characteristics, and the secondary asset IDs stored in the secondary asset tags 308a-k may be associated with a second set of asset characteristics. For example, the first set of asset characteristics may be asset types, and the second set of asset characteristics may be asset dimensions (e.g., lengths). In this way, the primary asset tags 306a-c (and the primary asset IDs they contain) may be used in combination with the secondary asset tags 308a-k (and the secondary asset IDs they contain) to encode and retrieve detailed information about the assets on the asset tray 300 in a way that is both efficient and reduces errors in reading and storing information about actions performed in connection with assets on the asset tray 300.

The assets that are associated with any particular primary asset tag (and its corresponding primary asset ID) may be arranged in any configuration on the asset tray 300. In the particular example shown in FIG. 3, each of the primary asset groups (associated with primary asset tags 306a-c) is arranged in a two-dimensional grid. Furthermore, and as shown in the example of FIG. 3, different primary asset groups may include different (e.g., mutually exclusive) sets of assets on the tray.

The assets that are associated with any particular secondary asset tag (and its corresponding secondary asset ID) may be arranged in any configuration on the asset tray 300. In the particular example shown in FIG. 3, each of the secondary asset groups 304a-k (associated with secondary asset tags 308a-k) is arranged in a row. Furthermore, and as shown in the example of FIG. 3, different ones of the secondary asset groups 304a-k may include different (e.g., mutually exclusive) sets of assets on the asset tray 300.

Secondary asset groups may cut across primary asset groups. In other words, a single secondary asset group may include assets in a plurality of primary asset groups (even if any individual asset within a secondary asset group is only in a single one of the plurality of primary asset groups). For example, in the example shown in FIG. 3, the secondary asset group (row) associated with secondary asset tag 308a includes assets in primary asset group 302a, primary asset group 302b, and primary asset group 302c.

For example, a first secondary asset group may include a subset (e.g., a proper subset) of the assets in a first primary asset group and a subset (e.g., a proper subset) of the assets in a second primary asset group. A second secondary asset group may include a subset (e.g., a proper subset) of the assets in the first primary asset group and a subset (e.g., a proper subset) of the assets in the secondary primary asset group. The first secondary asset group and the second secondary asset group may be disjoint.

As described above, embodiments of the present invention may be used to store information about actions performed in connection with assets on trays. Similar techniques may be used to store information about actions performed in connection with assets that are stored on trays which use both primary asset IDs and secondary asset IDs, such as the asset tray 300 of FIG. 3. In general, the techniques described above for storing information about an action performed in connection with an asset based on a tray ID and asset ID may be adapted to store information about an action performed in connection with an asset based on a tray ID, a primary asset ID, and a secondary asset ID.

For example, when any action is performed on an asset that stored in an asset tray that includes both primary asset tags and secondary asset tags, or on an asset that previously was stored in such a tray, embodiments of the present invention may be used to easily store a record of such an action in a modified version of the table 200 shown in FIG. 2. Such a modified version of the table 200 may be the same as the table 200 shown in FIG. 2, but include both a primary asset ID column and a secondary asset ID column, instead of only the asset ID column 202b shown in FIG. 2.

For example, when any action is performed on an asset stored in (or previously stored in) a tray, the following steps may be performed: (1) the tray that contains (or previously contained) the asset is identified; (2) the tray tag of the identified tray is identified; (3) the tray ID of the identified tray is read from the identified tray tag; (4) the human-readable primary asset tag that is associated with the asset is identified; (5) the primary asset ID of the asset is read from the identified human-readable primary asset tag; (6) the human-readable secondary asset tag that is associated with the asset is identified; (7) the secondary asset ID of the asset is read from the identified human-readable secondary asset tag. The read tray ID, the read primary asset ID, and the read secondary asset ID may be used to store information about the action that was performed on the asset and/or to store information about the disposition of the asset. For example, a globally-unique asset ID may be formed using the read tray ID, the read primary asset ID, and the read secondary asset ID, and that globally-unique asset ID may be used to store information about the performed action and/or disposition of the asset. The globally-unique asset ID may, for example, include both the read tray ID, the read primary asset ID, and the read secondary asset ID.

The identified primary asset tag may be human-readable. As a result, the primary asset ID of the asset may be read from the identified human-readable primary asset tag by a human. The same human, or a different human, may manually enter the read primary asset ID into a computer system, such as the same computer system that received and/or stored the tray ID.

The identified secondary asset tag may be human-readable. As a result, the secondary asset ID of the asset may be read from the identified human-readable secondary asset tag by a human. The same human, or a different human, may manually enter the read secondary asset ID into a computer system, such as the same computer system that received and/or stored the tray ID.

The combination of tray ID, primary asset ID, and secondary asset ID may be used to retrieve detailed information about specific assets from external data sources. This ability is particularly useful in environments where assets, such as surgical tools or components, have multiple characteristics that need to be precisely managed and tracked. For example, as described above, the primary asset ID may correspond to a general characteristic of the asset, such as its type or category, while the secondary asset ID may specify a particular attribute, such as size or length. When detailed information about an asset is required, embodiments of the present invention may perform a retrieval process. This could be initiated manually by a user or automatically. Embodiments of the present invention may constructs a query using the tray ID, primary asset ID, and secondary asset ID. This query is designed to match the asset's identifiers with records in one or more external databases. The query is sent to the external data source(s). These sources could be internal databases maintained by the healthcare facility or external databases provided by equipment manufacturers or regulatory bodies. The databases are structured to associate each combination of tray ID, primary asset ID, and secondary asset ID with specific records that contain detailed information about the asset.

The database processes the query and returns data corresponding to the identifiers. For example, if the query includes the tray ID and primary asset ID, the database might return general information about the asset type, such as its intended use, material composition, and any relevant safety guidelines. If the query also includes the secondary asset ID, the database might provide more specific information, such as the asset's dimensions, manufacturing date, and compatibility with other tools or components. The retrieved information may be stored (e.g., in a data structure such as the table 200) and/or displayed to the user.

The use of primary and secondary asset IDs, as described, addresses several significant challenges in the management and documentation of surgical assets, particularly in complex environments like orthopedic surgeries. For example, surgical trays can contain a multitude of small, similarly appearing items like screws, which vary by type, size, and function. Traditional methods of marking these items directly are impractical due to their small size and the need for sterilization. Furthermore, the limited space in surgical environments and the need to sterilize equipment in autoclaves restrict the size and layout of surgical trays, complicating the task of organizing and identifying numerous small items efficiently.

The manual processes traditionally used to document the use of surgical assets are time-consuming, prone to error, and disruptive to the workflow of surgical staff. These processes often involve transcribing detailed descriptions of each item used, which increases the likelihood of errors in patient records and inventory management. Furthermore, surgical trays often need to be customized to individual surgeon preferences, adding another layer of complexity to asset management and identification.

Embodiments of the present invention which incorporate both primary asset tags (containing primary asset IDs) and secondary asset tags (containing secondary asset IDs) on a single tray, along with a tray tag (containing a tray tag) on that tray, address these and other problems with conventional approaches.

For example, by assigning a primary asset ID to indicate one characteristic of an asset (e.g., the type of screw) and a secondary asset ID to indicate another characteristic of the asset (e.g., the length of screw), embodiments of the present invention simplify the identification process. This hierarchical tagging system reduces the cognitive load on surgical technicians and nurses, allowing them to refer to one simple number at a time, rather than a complex description (such as "10 MM variable angle locking screw").

The use of a simple indexing system, incorporating a combination of a tray asset, primary asset ID, and secondary asset ID for each asset, linked to a comprehensive database ensures that all relevant details about an asset are accurately captured and easily accessible. This reduces the risk of errors in patient records and improves the efficiency of the surgical process.

With each pair of asset characteristics (e.g., type and length) being uniquely identifiable through a combination of primary and secondary IDs, inventory tracking and resupply processes become more streamlined and accurate. This system facilitates better inventory control and usage tracking, which is critical for hospital resource management.

The system's flexibility allows for easy customization of surgical trays according to specific surgeon preferences without compromising the efficiency of asset management. Additionally, the system is scalable, capable of accommodating an increasing variety of asset characteristics (e.g., types and sizes) as new surgical techniques and tools are developed.

By linking simple asset IDs to a sophisticated database, the system integrates seamlessly with digital health records and inventory management systems. This integration supports real-time data entry and retrieval, enhancing overall operational efficiency and data integrity.

In summary, the use of primary and secondary asset IDs in a hierarchical ordering system significantly mitigates the challenges associated with managing small, diverse surgical assets. This system not only improves the accuracy and efficiency of surgical operations but also enhances the management of medical inventories, ultimately contributing to better patient care and resource utilization.

One embodiment is directed to a method for tracking and recording actions performed on assets, the method comprising reading, from a machine-readable tray tag associated with a tray, a tray identifier that identifies the tray; reading, from a first human-readable asset tag in the tray, a first asset identifier associated with a first asset in the tray; forming, based on the tray identifier and the first asset identifier, a first globally-unique asset identifier associated with the first asset in the tray; and using the first globally-unique asset identifier to record information in a computer-readable medium about at least one of: (1) an action performed on the first asset; or (2) a disposition of the first asset.

The tray may include a plurality of human-readable asset tags having a plurality of corresponding asset identifiers. The plurality of human-readable asset tags may include the first human-readable asset tag. Each asset identifier in the plurality of corresponding asset identifiers may be unique within the tray.

Reading the tray identifier may comprise scanning a barcode on the machine-readable tray tag using a barcode scanner.

Reading the tray identifier may comprise reading an RFID tag on the machine-readable tray tag using an RFID reader.

Reading the tray identifier may comprise scanning a QR code on the machine-readable tray tag.

Reading the tray identifier may comprise reading an NFC tag on the machine-readable tray tag using an NFC-enabled device.

The machine-readable tray tag may be coupled to the tray by at least one of: affixing the machine-readable tray tag to an exterior surface of the tray; embedding the machine-readable tray tag within the tray; incorporating the machine-readable tray tag into a structural element of the tray; or mounting the machine-readable tray tag in a holder attached to the tray.

Affixing the machine-readable tray tag to the exterior surface may comprise at least one of: adhesively bonding the machine-readable tray tag to the tray; mechanically fastening the machine-readable tray tag to the tray; or welding the machine-readable tray tag to the tray.

Incorporating the machine-readable tray tag into the structural element may comprise integrating the machine-readable tray tag into at least one of: a wall of the tray; a rim of the tray; a handle of the tray; a base of the tray; or a support member of the tray.

The tray identifier may comprise at least one of: a numeric code; an alphanumeric string; a binary code; a hexadecimal code; or a data matrix.

The machine-readable tray tag may comprise: a machine-readable component containing a machine-readable version of the tray identifier; and a human-readable component containing a human-readable version of the tray identifier.

The first human-readable asset tag may comprise a laser-engraved metal sticker affixed to the tray. The first human-readable asset tag may comprise printed text directly on the tray. The first asset identifier may consist of a string of no more than four characters. The first asset identifier may consist of a single character. The first asset identifier may differ from a manufacturer's part number of the first asset. The first human-readable asset tag may be located adjacent to the first asset on the tray. The first human-readable asset tag may include a directional member that points toward the first asset on the tray. The directional member may comprise at least one of: a printed arrow; an arrow sticker; a tapered physical member; or a light projection.

Forming the first globally-unique asset identifier may comprise concatenating the tray identifier and the first asset identifier.

Using the first globally-unique asset identifier may comprise using the first globally-unique asset identifier to look up a manufacturer's part number associated with the first asset in a database that maps globally-unique asset identifiers to manufacturer part numbers.

Using the first globally-unique asset identifier may comprise: machine-reading a plurality of tray identifiers, including the tray identifier, at a start of a surgical episode; assigning human-readable descriptions to the plurality of tray identifiers; displaying the human-readable descriptions; and recording information about the first asset without requiring additional machine-reading of the plurality of tray identifiers during the surgical episode.

Recording information about multiple assets from multiple trays during the surgical episode may be performed using the displayed human-readable descriptions without requiring additional machine-reading of tray identifiers.

Using the first globally-unique asset identifier may comprise: using the first globally-unique asset identifier to retrieve asset information from at least one external data source that associates the first globally-unique asset identifier with the retrieved asset information; and recording the retrieved asset information in the computer-readable medium.

Reading, from a secondary human-readable asset tag in the tray, a secondary asset identifier associated with the first asset in the tray may be performed, wherein the secondary asset identifier specifies an attribute of the first asset. Forming the first globally-unique asset identifier may comprise forming, based on the tray identifier, the first asset identifier, and the secondary asset identifier, an extended globally-unique asset identifier associated with the first asset.

The secondary asset identifier may specify any one or more of the following properties: a size of the first asset, a length of the first asset, a material composition of the first asset, specific usage properties of the first asset, dimensions of the first asset, manufacturing date of the first asset, compatibility with other tools or components, sterilization status, maintenance requirements, or certification status. The first asset identifier may indicate a type of the first asset, and the secondary asset identifier may indicate a dimension of the first asset.

The first asset identifier and the secondary asset identifier may be unique among all asset identifiers on the tray.

The secondary human-readable asset tag may be arranged in a row on the tray, and the row may include assets from multiple primary asset groups identified by different first asset identifiers.

The first asset identifier may comprise: an asset class identifier indicating an asset class of the first asset; and an identifying portion that identifies the first asset within the asset class.

The asset class identifier may comprise any one or more of the following: a letter indicating the asset class, a number indicating the asset class, an alphanumeric code indicating the asset class, a symbol indicating the asset class, a color code indicating the asset class, an icon indicating the asset class, a prefix indicating the asset class, a pattern indicating the asset class, a shape indicating the asset class, or a combination of identifying elements indicating the asset class.

The identifying portion may comprise a numeric identifier that uniquely identifies the first asset within the asset class indicated by the asset class identifier.

The identifying portion may comprise a pre-existing property indicator, on the tray, that indicates a property of a subset of assets within the asset class on the tray, wherein the subset of assets includes the first asset.

The first asset identifier may maintain human readability while providing asset class verification through the asset class identifier.

One embodiment is directed to a surgical tray system comprising a tray; a plurality of assets; a machine-readable tray tag coupled to the tray, wherein the machine-readable tray tag contains a tray identifier that identifies the tray; a plurality of human-readable asset tags in the tray, wherein each human-readable asset tag contains a corresponding asset identifier, whereby the plurality of human-readable asset tags contains a plurality of corresponding asset identifiers, each asset identifier corresponds to a corresponding asset in the tray, and each asset identifier is unique among the plurality of corresponding asset identifiers; and a plurality of secondary human-readable asset tags in the tray, wherein each secondary human-readable asset tag contains a corresponding secondary asset identifier, whereby the plurality of secondary human-readable asset tags contains a plurality of corresponding secondary asset identifiers, each secondary asset identifier specifies an attribute of a corresponding asset in the tray, and each secondary asset identifier is unique among the plurality of secondary human-readable asset tags in the tray.

The machine-readable tray tag may include at least one of a barcode that is readable by a barcode scanner; an RFID tag that is readable by an RFID reader; a QR code that is scannable; or an NFC tag that is readable by an NFC-enabled device.

The machine-readable tray tag may be coupled to the tray by at least one of: affixing the machine-readable tray tag to an exterior surface of the tray; embedding the machine-readable tray tag within the tray; incorporating the machine-readable tray tag into a structural element of the tray; or mounting the machine-readable tray tag in a holder attached to the tray.

Affixing the machine-readable tray tag to the exterior surface may comprise at least one of: adhesively bonding the machine-readable tray tag to the tray; mechanically fastening the machine-readable tray tag to the tray; or welding the machine-readable tray tag to the tray.

Incorporating the machine-readable tray tag into the structural element may comprise integrating the machine-readable tray tag into at least one of: a wall of the tray; a rim of the tray; a handle of the tray; a base of the tray; or a support member of the tray.

The tray identifier may comprise at least one of: a numeric code, an alphanumeric string, a binary code, a hexadecimal code, or a data matrix.

The machine-readable tray tag may comprise: a machine-readable component containing a machine-readable version of the tray identifier; and a human-readable component containing a human-readable version of the tray identifier.

At least one of the human-readable asset tags may comprise a laser-engraved metal sticker affixed to the tray. At least one of the human-readable asset tags may comprise printed text directly on the tray.

At least one asset identifier in the plurality of corresponding asset identifiers may consist of a string containing no more than four characters. The at least one asset identifier may consist of a single character.

At least one of the human-readable asset tags may be located adjacent to its corresponding asset on the tray.

At least one of the human-readable asset tags may include a directional member that points toward its corresponding asset on the tray. The directional member may comprise at least one of: a printed arrow, an arrow sticker, a tapered physical member, or a light projection.

The plurality of human-readable asset tags may include: an asset class identifier indicating an asset class of the corresponding asset; and an identifying portion that identifies the corresponding asset within the asset class. The asset class identifier may comprise a letter indicating the asset class. The identifying portion may comprise a pre-existing property indicator, on the tray, that indicates a property of a subset of assets within the asset class on the tray, wherein the subset of assets includes the corresponding asset.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, tracking and updating of asset locations and statuses across multiple trays require complex data processing, instantaneous data retrieval, and dynamic data updating that can only be efficiently handled by computer systems. Additionally, the generation of globally unique asset IDs from a combination of tray IDs and asset IDs involves relational database operations, such as joins and concatenations, which are computationally intensive and cannot be feasibly performed without the aid of computerized systems. The system's ability to integrate with various external data sources for automatic updating of asset information also relies on network communications and data exchange protocols that are inherently computer-based operations.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method for tracking and recording actions performed on assets, the method comprising:
    reading, from a machine-readable tray tag associated with a tray, a tray identifier that identifies the tray;
    reading, from a first human-readable asset tag in the tray, a first asset identifier associated with a first asset in the tray, wherein the first human-readable asset tag comprises at least one of: a laser-engraved metal sticker affixed to the tray, or a tag located adjacent to the first asset on the tray;
    forming, based on the tray identifier and the first asset identifier, a first globally-unique asset identifier associated with the first asset in the tray; and
    using the first globally-unique asset identifier to record information in a computer-readable medium about at least one of: (1) an action performed on the first asset; or (2) a disposition of the first asset.

2. The method of claim 1:
    wherein the tray includes a plurality of human-readable asset tags having a plurality of corresponding asset identifiers;
    wherein the plurality of human-readable asset tags includes the first human-readable asset tag; and
    wherein the first asset identifier is unique among the plurality of corresponding asset identifiers.

3. The method of claim 1, wherein reading the tray identifier comprises scanning a barcode on the machine-readable tray tag using a barcode scanner.

4. The method of claim 1, wherein the machine-readable tray tag is coupled to the tray by affixing the machine-readable tray tag to an exterior surface of the tray.

5. The method of claim 4, wherein affixing the machine-readable tray tag to the exterior surface comprises adhesively bonding the machine-readable tray tag to the tray.

6. The method of claim 4, wherein incorporating the machine-readable tray tag into the structural element comprises integrating the machine-readable tray tag into a side of the tray.

7. The method of claim 1, wherein the tray identifier comprises a numeric code.

8. The method of claim 1, wherein the machine-readable tray tag comprises:
    a machine-readable component containing a machine-readable version of the tray identifier; and a human-readable component containing a human-readable version of the tray identifier.

9. The method of claim 1, wherein forming the first globally-unique asset identifier comprises concatenating the tray identifier and the first asset identifier.

10. The method of claim 1, further comprising using the first globally-unique asset identifier to look up a manufacturer's part number associated with the first asset in a database that maps globally-unique asset identifiers to manufacturer part numbers.

11. The method of claim 1, wherein using the first globally-unique asset identifier to record the information in the computer-readable medium comprises:
   using the first globally-unique asset identifier to retrieve asset information from an external data source that associates the first globally-unique asset identifier with the retrieved asset information; and
   recording the retrieved asset information in the computer-readable medium.

12. The method of claim 1, further comprising:
   reading, from a secondary human-readable asset tag in the tray, a secondary asset identifier associated with the first asset in the tray, wherein the secondary asset identifier specifies an attribute of the first asset;
   wherein (C) comprises forming, based on the tray identifier, the first asset identifier, and the secondary asset identifier, the first globally-unique asset identifier associated with the first asset.

13. The method of claim 12, wherein the secondary asset identifier specifies a length of the first asset.

14. The method of claim 1, wherein the first asset identifier comprises:
   an asset class identifier indicating an asset class of the first asset; and
   an identifying portion that identifies the first asset within the asset class.

15. A surgical tray system comprising:
   a tray;
   a plurality of assets;
   a machine-readable tray tag coupled to the tray, wherein the machine-readable tray tag contains a tray identifier that identifies the tray;
   a plurality of human-readable asset tags in the tray, wherein:
      each human-readable asset tag contains a corresponding asset identifier, whereby the plurality of human-readable asset tags contains a plurality of corresponding asset identifiers;
      each asset identifier corresponds to a corresponding asset in the tray; and
      each asset identifier is unique among the plurality of corresponding asset identifiers; and
   a plurality of secondary human-readable asset tags in the tray, wherein:
      each secondary human-readable asset tag contains a corresponding secondary asset identifier, whereby the plurality of secondary human-readable asset tags contains a plurality of corresponding secondary asset identifiers;
      each secondary asset identifier specifies an attribute of a corresponding asset in the tray; and
      each secondary asset identifier is unique among the plurality of secondary human-readable asset tags in the tray.

16. The surgical tray system of claim 15, wherein the machine-readable tray tag comprises at least one of:
   a barcode that is readable by a barcode scanner;
   an RFID tag that is readable by an RFID reader;
   a QR code that is scannable; or
   an NFC tag that is readable by an NFC-enabled device.

17. The surgical tray system of claim 15, wherein the machine-readable tray tag comprises:
   a machine-readable component containing a machine-readable version of the tray identifier; and
   a human-readable component containing a human-readable version of the tray identifier.

18. The surgical tray system of claim 15, wherein the plurality of human-readable asset tags includes:
   an asset class identifier indicating an asset class of the corresponding asset; and
   an identifying portion that identifies the corresponding asset within the asset class.

* * * * *